US012453922B2

(12) United States Patent
Mendoza et al.

(10) Patent No.: US 12,453,922 B2
(45) Date of Patent: Oct. 28, 2025

(54) LOTTERY TICKETS HAVING MULTIPLE COMBINATIONS OF BOARDS AND PLAYER SYMBOL SETS

(71) Applicant: Brightstar Global Solutions Corporation, Providence, RI (US)

(72) Inventors: Marc Mendoza, Winter Haven, FL (US); David Stark, Lakeland, FL (US); Joy Barbee, Lakeland, FL (US); Kary Hacker, Indianapolis, IN (US)

(73) Assignee: Brightstar Global Solutions Corporation, Providence, RI (US)

( * ) Notice: Subject to any disclaimer, the term of this patent is extended or adjusted under 35 U.S.C. 154(b) by 714 days.

(21) Appl. No.: 17/812,628

(22) Filed: Jul. 14, 2022

(65) Prior Publication Data

US 2024/0017159 A1 Jan. 18, 2024

(51) Int. Cl.
*A63F 3/06* (2006.01)
*G07F 17/32* (2006.01)

(52) U.S. Cl.
CPC .......... *A63F 3/0665* (2013.01); *G07F 17/329* (2013.01)

(58) Field of Classification Search
None
See application file for complete search history.

(56) References Cited

U.S. PATENT DOCUMENTS 5,566,942 A 10/1996 Elum
5,855,514 A 1/1999 Kamille
6,305,687 B1 * 10/2001 Pollock .................. A63F 3/069 463/19
6,460,854 B1 10/2002 Mccarey
7,300,348 B2 11/2007 Kaminkow et al.
7,604,539 B2 10/2009 Hartl et al.
8,042,809 B2 10/2011 Walker et al.
8,287,364 B2 10/2012 Caputo et al.
8,460,081 B2 6/2013 Meyer
9,728,048 B2 8/2017 Saunders
9,984,534 B2 5/2018 Trainor
10,173,126 B2 1/2019 Brouillard et al.
2003/0029557 A1 * 2/2003 Hwang ................ B42D 15/025 156/247
2004/0195765 A1 10/2004 Bellefleur
2005/0250575 A1 * 11/2005 Kane ....................... G07F 17/32 463/17

(Continued)

OTHER PUBLICATIONS

Crossword Extreme, Jun. 13, 2021 https://web.archive.org/web/20210613200019/https://www.bclcretailerhub.com/content/dam/retailerhub/scratch-and-win/tickets/2021/$20-crossword-extreme-ris-311104-apr6-2021.pptx.pdf) . Accessed May 10, 2025. (Year: 2021).*

(Continued)

*Primary Examiner* — Paul A D'agostino
(74) *Attorney, Agent, or Firm* — Neal, Gerber & Eisenberg LLP

(57) ABSTRACT

Lottery tickets and lottery gaming systems and methods providing such lottery tickets, wherein the lottery tickets each have multiple combinations of boards and player symbol sets, wherein each of the multiple combinations includes two different boards and one player symbol set for both boards, and each of the board/player symbol set combination includes a first award associated with the first one of the boards of that combination a second award associated with a second one of the boards of that combination.

13 Claims, 4 Drawing Sheets

(56) References Cited

U.S. PATENT DOCUMENTS

| | | | | |
|---|---|---|---|---|
| 2006/0160602 | A1* | 7/2006 | Blythe | G07F 17/32 463/17 |
| 2006/0205468 | A1* | 9/2006 | Saffari | G07F 17/32 463/16 |
| 2006/0279038 | A1* | 12/2006 | Irwin | A63F 3/0665 463/17 |
| 2009/0167012 | A1* | 7/2009 | Martineck, Sr. | A63F 3/0665 283/67 |
| 2010/0045026 | A1 | 2/2010 | Napolitano et al. | |
| 2011/0042896 | A1 | 2/2011 | Napolitano et al. | |
| 2011/0281629 | A1* | 11/2011 | Meyer | A63F 3/081 463/17 |
| 2012/0202574 | A1* | 8/2012 | Stanek | G07F 17/3272 463/17 |
| 2014/0011569 | A1 | 1/2014 | Saunders et al. | |
| 2014/0228088 | A1* | 8/2014 | Katz | G07F 17/329 463/17 |
| 2014/0375045 | A1* | 12/2014 | Jackson | G07F 17/32 283/67 |
| 2015/0115593 | A1* | 4/2015 | Jackson | B41M 3/005 283/67 |
| 2015/0379804 | A1 | 12/2015 | Casey | |
| 2016/0012680 | A1* | 1/2016 | Katz | G07F 17/3244 463/25 |
| 2016/0307405 | A1* | 10/2016 | Koll | G07F 17/3244 |
| 2018/0165912 | A1 | 6/2018 | Vengrofski | |
| 2018/0169513 | A1* | 6/2018 | Brouillard | G07F 17/32 |
| 2018/0369687 | A1* | 12/2018 | Stephens | B42D 15/025 |
| 2020/0398150 | A1 | 12/2020 | Kennedy | |

OTHER PUBLICATIONS

Crossword, Jan. 18, 2021 https://www.bclcretailerhub.com/content/dam/retailerhub/scratch-and-win/tickets/2020/%242-crossword-ris-310122.pdf) . Accessed on May 10, 2025. (Year: 2021).*

Ozard Radio News, Jun. 29, 2020, ozardradionews.com. Accessed on May 9, 2025. (Year: 2020).*

"Cash Crossword", https://nelottery.com/homeapp/scratch/1163/0/gamedetail/web; available prior to Sep. 20, 2021.

"CUBE Cashword", available prior to Sep. 20, 2021.

"CUBE Crossword", available at: https://m.nelottery.com/homeapp/static/shared/images/scratch/ticket_art/1172_art.jpg; available prior to Sep. 20, 2021.

"Lights, Camera, Crossword!", Wisconsin Lottery, located at https://www.wilottery.com/games/instant-games/lights-camera-crossword-2372, Jul. 23, 2021.

"One Word Crossword", https://wvlottery.com/instant-games/one-word-crossword/; available prior to Sep. 20, 2021.

* cited by examiner

LOTTERY TICKETS HAVING MULTIPLE COMBINATIONS OF BOARDS AND PLAYER SYMBOL SETS

CROSS-REFERENCE TO RELATED APPLICATIONS

This application is related to the following commonly owned patent application: U.S. application Ser. No. 29/865,221, entitled "LOTTERY TICKET,".

BACKGROUND

The present disclosure relates to lottery tickets having multiple combinations of boards and player symbol sets, and to lottery gaming systems and methods for providing such lottery tickets.

Instant lottery tickets are widely available. Instant lottery tickets may include predetermined win or lose indicia information under one or more coverings such as a scratch-off-coating ("SOC"). The coverings are used to ensure that the lottery ticket has not been previously played. Millions of different types of instant lottery tickets are produced and sold every year.

BRIEF SUMMARY

In various embodiments, the present disclosure provides a lottery ticket including: a base; multiple separate combinations of boards and player symbol sets on the base, wherein each of the multiple separate combinations includes different first and second boards and one player symbol set for the first and second boards, each of the first and second boards including at least one symbol set; a removable covering on the base and covering the player symbol sets; and a paytable on the base, the paytable indicating first awards respectively associated with the first boards, and the paytable indicating second awards respectively associated with the second boards.

In various other embodiments, the present disclosure provides a lottery ticket including: a base; a first board, a second board, and a first player symbol set on the base, wherein the first board is different than the second board, wherein the first board includes a plurality of symbol sets, wherein the second board includes one symbol set, and wherein the first player symbol set is for both of the first and second boards; a third board, a fourth board, and a second player symbol set on the base, wherein the third board is different than the fourth board, wherein the third board includes a plurality of symbol sets, wherein the fourth board includes one symbol set, and wherein the second player symbol set is for both of the third and fourth boards; a removable covering on the base and covering the first and second player symbol sets; and a paytable on the base, the paytable indicating first and second awards respectively associated with the first and second boards, and the paytable indicating third and fourth awards respectively associated with the third and fourth boards.

In various other embodiments, the present disclosure provides a lottery ticket including: a base; a first board, a second board, and a first player symbol set on the base, wherein the first board is different than the second board, wherein the first board includes a plurality of symbol sets, wherein the second board includes only one symbol set, and wherein the first player symbol set is for both of the first and second boards; a third board, a fourth board, and a second player symbol set on the base, wherein the third board is different than the fourth board, wherein the third board includes a plurality of symbol sets, wherein the fourth board includes only one symbol set, and wherein the second player symbol set is for both of the third and fourth boards; a fifth board, a sixth board, and a third player symbol set on the base, wherein the fifth board is different than the sixth board, wherein the fifth board includes a plurality of symbol sets, wherein the sixth board includes one symbol set, wherein the third player symbol set is for both of the fifth and sixth boards; a removable covering on the base and covering the first and second player symbol sets; and a paytable on the base, the paytable indicating first and second awards respectively associated with the first and second boards, the paytable indicating third and fourth awards respectively associated with the third and fourth boards, and the paytable indicating fifth and sixth awards respectively associated with the fifth and sixth boards, wherein the first, second, third, fourth, fifth, and sixth awards are different.

Additional features are described in, and will be apparent from, the following Detailed Description and the figures.

DETAILED DESCRIPTION

Figure 1:
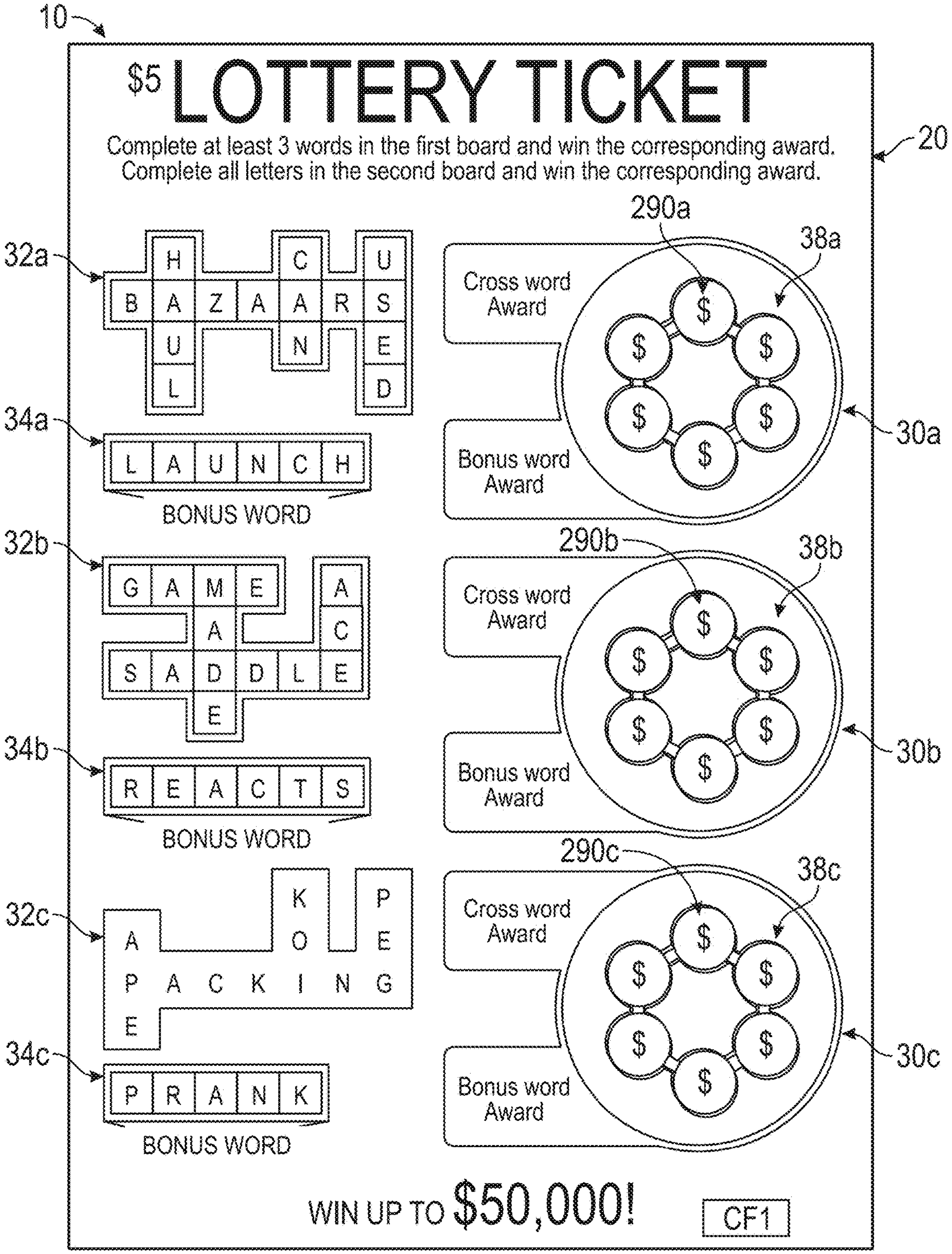
FIG. 1 is a front view of an example lottery ticket of one embodiment of the present disclosure that includes multiple combinations of boards and player symbol sets, and showing the lottery ticket with the SOCs in place covering the player symbol sets.

In various embodiments, the present disclosure relates to lottery tickets having multiple combinations of boards and player symbol sets, and lottery gaming systems and methods of operating lottery gaming systems that create, provide, and process such lottery tickets. In various embodiments of the present disclosure, each of a plurality of different lottery tickets for a lottery game that is created and provided by the lottery gaming system includes: a base (such as a paper substrate); multiple combinations of different boards and player symbol sets on the base; a paytable on the base that shows the potential awards that can be won for each of the combinations of boards and the player symbol sets. In various embodiments, each of the board/player symbol set combinations includes two different boards and one player symbol set for both boards. In various embodiments, each of the board/player symbol set combinations includes: (1) a first award associated with the first one of the boards of that board/player symbol set combination (and thus that lottery ticket); and (2) a second award associated with a second one of the boards of that board/player symbol set combination (and thus that lottery ticket). In various embodiments, the first awards are winnable based on the symbol sets completed on the first boards based on the player symbol sets respectively associated with those first boards, and the second awards are winnable based on the completed symbol sets on the second boards based on the player symbol sets respectively associated with those second boards.

In various embodiments, the symbol sets on the first and second boards each are words, each of the symbols on the first and second boards are letters, and each player symbol set includes a plurality of player letters. In various such embodiments, each of the first and second boards (such as a crossword type board) can have one or more words on that first and second boards. In various embodiments, one or more of the second boards each only have one word on that second board. In various such embodiments, the first awards are based on the quantity of words completed on each of the first boards based on the respective player letters associated with those first boards, and the second awards (if any) are based on the quantity of completed words on each of the second boards based on the respective player letters associated with those second boards. In various such embodiments, each second board includes only one word.

In various embodiments, for each lottery ticket, the first boards of the lottery ticket each include one or a plurality of rows, one or a plurality of columns, and a plurality of spaces formed by the rows and columns. In various embodiments, the symbols (such as the letters) and thus the symbol sets (such as the words) on the first boards are respectively positioned in the spaces of those first boards. It should be appreciated that each first board can be alternatively shaped, sized, and otherwise configured in accordance with the present disclosure. In various embodiments, in addition to the non-see through SOCs covering the player symbol sets on the base, the symbols on the first boards can be also be covered with see-through SOCs that enable a player to see the symbols on the first boards under the see-through SOCs and to remove such SOCs for each of the symbols on the first boards that matches one of the player symbols of the associated player symbol set to enable the player to keep track of or visually see the symbol sets (such as the words) that are uncompleted, partially completed, and fully completed on the first boards based on the revealed player symbols of the respective player symbol sets as those player symbols are revealed by the player removing the SOCs covering the respective player symbol sets. In the example embodiments discussed herein, the see-through SOCs over the symbols (such as the words) on the first boards are not employed for brevity and simplicity. In various other embodiments, the symbols on the first boards can also be covered with SOCs that the player has to remove to see the symbols on the first boards.

In various embodiments, for each lottery ticket, the second boards of the lottery ticket each include a single row or a single column, and a plurality of spaces formed by the row or the column. In various embodiments, the symbols (such as the letters) and thus the symbol set (such as the word) of each board is respectively positioned in the spaces of that second board. It should be appreciated that each second board can be alternatively shaped, sized, and otherwise configured in accordance with the present disclosure. In various embodiments, in addition to non-see through SOCs covering the player symbols of the player symbol sets on the base, the symbols on the second boards can be also be covered with see-through SOCs that enable a player to see the symbols on the second boards under the see-through SOCs and to remove such SOCs for each of the symbols on the second boards that matches one of the player symbols of the associated player symbol set to enable the player to keep track of or visually see the symbol sets (such as the words) that are uncompleted, partially completed, and fully completed on the second boards based on the revealed player symbols of the respective player symbol sets as those player symbols are revealed by the player removing the SOCs covering the respective player symbol sets. In the example embodiments discussed herein, the see-through SOCs over the symbols (such as the words) on the second boards are not employed for brevity and simplicity. In various other embodiments, the symbols on the second boards can also be covered with SOCs that the player has to remove to see the symbols on the second boards.

In various embodiments, the quantity of the spaces on the each of the first and second boards can vary in accordance with the present disclosure. The quantity of spaces, the quantity of symbol sets, and/or the arrangements of the symbol sets on the first and second boards can be predetermined, randomly determined, or otherwise suitably determined by the gaming system for each lottery ticket. It should further be appreciated that a plurality of the lottery tickets for a game provided by the lottery gaming system can have the same or different quantities of spaces on each of the first and second boards. Thus, it should be appreciated that for the lottery tickets for a lottery game, the first and second board configurations can be the same or can vary. If the first and second board configurations vary, the lottery game can have a substantial quantity of different lottery tickets with different first and/or second board configurations.

In various embodiments, for each lottery ticket, for each player symbol set of each board/player symbol set combination, the plurality of player symbols includes zero, one, and/or a plurality of the symbols (such as different symbols). In various embodiments, the plurality of player symbols of each player symbol set are randomly determined for each lottery ticket by the gaming system. In various embodiments, the plurality of player symbols for each player symbol set are otherwise determined. In various embodiments, for each lottery ticket, the lottery ticket includes a plurality of different player symbols (such as different player letters) for each player symbol set. The quantity of these player symbols for each player symbol set for each lottery ticket can be the same for each of the player symbol sets of a lottery ticket and/or for each lottery ticket of a lottery game in accordance with the present disclosure. Alternatively, the quantity of these player symbols for each player symbol set for each lottery ticket can vary for two or more or each of the player symbol sets and/or for two or more of the lottery tickets of a lottery game in accordance with the present disclosure. The quantity of the player symbols of each player symbol set on the lottery tickets can vary based on the wager on or purchase price for the lottery ticket in various embodiments. The quantity of the player symbols of each player symbol set on the lottery tickets can vary based on one or more other or additional factors for the lottery ticket in various embodiments.

As mentioned above, in various embodiments, for each lottery ticket, the lottery ticket further includes: (a) one or more first non-see through coverings (such as a scratch-off coatings or SOCs for physical lottery tickets) over the plurality of player symbols (such as the player letters) for each player symbol set for the lottery ticket; and (b) one or more second see-through coverings (such as a scratch-off coatings or SOCs for physical lottery tickets) over the plurality of symbols (such as letters) on the first and second boards of each combination as described above. In various different embodiments, the two or more of the SOC coverings are combined. In various different embodiments, the two or more of the SOC coverings are separate.

In various embodiments, each lottery ticket provides multiple different possible ways for a player of the lottery ticket to potentially win awards (even though any particular lottery ticket can result in zero awards, only one award, a plurality of but less than a maximum quantity of potential awards, or the maximum quantity of potential awards) as determined by the gaming system that creates and provides that lottery ticket.

The first way for the player to win one or more awards of a first type is via the revealing of the plurality of the player symbols (such as player letters) on the base for each of the player symbol sets and a determination of whether any combinations of those player symbols (such as player letters) form any complete symbol sets (such as complete words) on the first board associated with that player symbol set. For this first award determination, the player can win an award based on the quantity of completed symbol sets (such as the quantity of completed words) on the first boards formed by any combinations of the player symbols (such as the player letters) of the player symbol set associated with those respective first boards. Different quantities of completed symbol sets (such as the different quantities of completed words) on the first boards can have different awards associated with such different quantities. In certain example embodiments, each completed symbol set (such as each completed word) has an associated award. In other example embodiments, specific quantities or levels of quantities of completed symbol sets (such as completed words) have different associated awards. In one example embodiment, each completed symbol set (such as each completed word) has an associated award. In other example embodiments, a minimum specific quantity of completed symbol sets (such as completed words) has a single first award associated with that minimum quantity. In various embodiments, the lottery ticket will have a paytable on the base or have a paytable otherwise associated with the lottery ticket that indicates the possible award(s) of this first type of award for each board/symbol player symbol set combination.

In various embodiments, the first type of awards for one or more of the completed symbol sets (such as completed words) can be based on a quantity of symbols of that completed symbol set (such as that completed word). For example, completed symbol sets (such as completed words) with a greater quantity of symbols (such as letters) can have higher awards associated with such completed symbol sets (such as completed words) than with a smaller quantity of symbols (such as letters).

In various embodiments, the first type of awards for one or more of the completed symbol sets (such as completed words) is independent of the quantity of symbols of that completed symbol set (such as that completed word). For example, each completed symbol sets (such as each completed words) can equally count toward determining any first type of award regardless of the quantity of symbols (such as letters) of that completed symbol set (such as that completed word).

In various embodiments, the first type of awards for one or more of the completed symbol sets (such as completed words) can be based on the probability of one or more symbols of that completed symbol set (such as that completed word) being a player symbol (such as a player letter). For example, completed symbol sets (such as completed words) with a greater quantity of lower probability symbols (such as lower probability letters) can have higher awards associated with such completed symbol sets (such as completed words) than with completed symbol sets (such as completed words) with a smaller quantity of lower probability symbols (such as lower probability letters). In these embodiments, the likelihood that a player obtains various different player symbols (such as different player letters) can be differently weighted.

The second way for the player to win one or more of a second type of award is via the revealing of the plurality of the player symbols (such as player letters) of the player symbol sets and a determination of whether any of the player symbols form any completed symbol sets (such as completed words) on any of the respective associated second boards. For this second award determination, the player can win a second type of award for each second board based on whether, for each second board, the symbol set (such as the word) on that second board is completed. In various embodiments, one or a plurality or each of the second boards only have a single symbol set (such as single word), and thus each symbol set of such second board can be completed based on such single symbol set being completed.

In various embodiments, the second type of awards for the second boards can be based on a quantity of symbols of the symbol sets (such as the word) of that second board. For example, a greater quantity of symbols of the symbol set (such as the word) can have a higher award associated with such symbol set (such as the word) than with a smaller quantity of symbols of the symbol set (such as the word).

In various embodiments, the second type of awards for the second boards can be independent of the quantity of symbols of the symbol sets (such as the words) of the second boards. For example, each completed symbol set (such as each completed word) can equally count toward determining any second type of award regardless of the quantity of symbols (such as letters) of that completed symbol set (such as that completed word).

In various embodiments, the second type of awards for the second boards can be based on the probability of one or more of those symbol sets (such as the words) being completed by the associated player symbols (such as the player letters).

In various embodiments, there are no cross overs between or among the respective combinations of boards and player symbol sets. In other words, such board/player symbol set combinations are completely separate and independent of each other. In such embodiments, the first and second awards for each combination are determined completely independent and separately from each other.

In various embodiments, there are one or more cross overs between or among the respective combinations of boards and player symbol sets. In certain of these embodiments, one or more of the player symbols from one or more of the player symbol sets can be employed for one or more of the first boards of one or more of the other board/player symbol set combinations. In other of these embodiments, one or more of the player symbols from one or more of the player symbol sets can be employed for one or more of the second boards of one or more of the other board/player symbol set combinations. In other of these embodiments, one or more of the player symbols from one or more of the player symbol sets can be employed for one or more of the first and/or second boards of one or more of the other board/player symbol set combinations.

In various other embodiments, there are one or more additional awards based on the completion of one or more combinations of the symbol sets of two or more of the first and/or second boards for different combinations of the boards/player symbol sets. For example, a third type of award can be based on a plurality or all of the first boards (such as the completed symbol sets of the first boards), a fourth type of award can be based on a plurality or all of the second boards (such as the completed symbol sets of the second boards), and a fifth type of award can be based on a plurality or all of the first and second boards (such as the completed symbol sets of the first and second boards).

Figure 2:
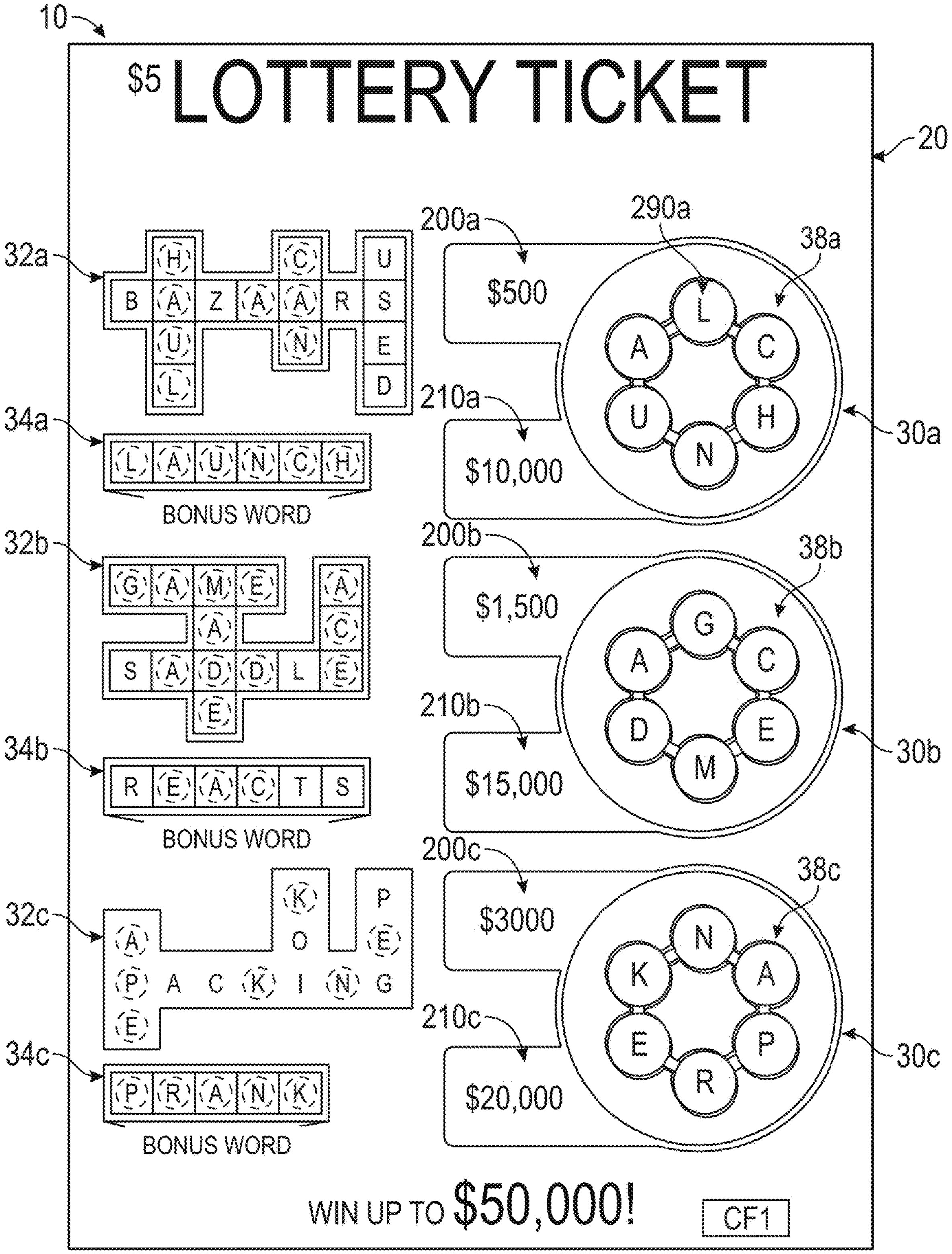
FIG. 2 is a front view of the example lottery ticket of FIG. 1, and showing the lottery ticket with the SOCs removed from covering the player symbol sets.

For purposes of further explaining an example embodiment of the present disclosure in conjunction with the example lottery ticket of FIGS. 1 and 2, the symbols of the lottery ticket are the letters A through Z that can form symbol sets in the form of words, and the player symbols can be selected from the letters A though Z. It should be appreciated that such examples are not meant to limit the present disclosure.

FIGS. 1 and 2 illustrate an example lottery ticket 10 for a lottery game of one embodiment of the present disclosure that can be provided by a lottery gaming system of the present disclosure and purchased by a player. In this example embodiment, the lottery ticket 10 includes a base in the form of a substrate 20 and three separate board and player symbol set combinations 30*a*, 30*b*, and 30*c* formed (such as printed) on the substrate 20 collectively including a plurality of boards and a plurality of symbol sets. More specifically, (1) board and player symbol set combination 30*a* includes first board 32*a*, second board 34*a*, and player symbol set 38*a*, (2) board and player symbol set combination 30*b* includes first board 32*b*, second board 34*b*, and player symbol set 38*b*, (3) board and player symbol set combination 30*c* includes first board 32*c*, second board 34*c*, and player symbol set 38*c*. Each of the first boards 32*a*, 32*b*, and 32*c* includes a plurality of letters that form a plurality of different words on that respective first board, and each of the second boards 34*a*, 34*b*, and 34*c* includes a plurality of letters that form a single word on that respective second board. The lottery ticket 10 further includes scratch-off coatings 290*a*, 290*b*, and 290*c* (shown in FIG. 1 and indicated by the dollar signs in this example) applied on the substrate 20 and initially respectively covering the sets of player letters 38*a*, 38*b*, and 38*c*, the first awards 200*a*, 200*b*, and 200*c*, and the second awards 210*a*, 210*b*, and 210*c* as shown in FIG. 1. FIG. 2 shows the lottery ticket 10 with the scratch-off coatings 290*a*, 290*b*, and 290*c* removed from the sets of player letters 38*a*, 38*b*, and 38*c*, the first awards 200*a*, 200*b*, and 200*c*, and the second awards 210*a*, 210*b*, and 210*c*.

This example lottery ticket 10 thus also includes a paytable that includes each of the first awards 200*a*, 200*b*, and 200*c*, and second awards 210*a*, 210*b*, and 210*c* on (such as printed on) the base 20. In this example embodiment, the first awards 200*a*, 200*b*, and 200*c* are won if a minimum quantity of words (such as three words in this example) are completed on the respective first boards 32*a*, 32*b*, and 32*c*. In this example embodiment, the second awards 210*a*, 210*b*, and 210*c* are won if a minimum quantity of words (such as one word in this example) are completed on the respective second boards 34*a*, 34*b*, and 34*c*.

More specifically, in this example: (1) completion of 3 words of the first board 32*a* results in a first award 200*a* of $500; (2) completion of 3 words of the first board 32*b* results in a first award 200*b* of $1,500; (3) completion of 3 words of the first board 32*c* results in a first award 200*c* of $3,000; (4) completion of the single word of the second board 34*a* results in a second award 210*a* of $10,000; (5) completion of the single word of the second board 34*b* results in a second award 210*b* of $15,000; and (6) completion of the single word of the second board 34*c* results in a second award 210*c* of $20,000. It should be appreciated that the quantities of completed words and associated awards and their respective amounts can vary in accordance with the present disclosure.

In this example, the board and player symbol set combination 30*a* includes the first board 32*a* having four words, the second board 34*a* having one word, and player symbol set 38*a* having six letters. In this example, the letters L, C, H, N, U, and A of the player symbol set 38*a* form only two of the completed words including HAUL and CAN of the first board 32*a*, and thus the player does not win the award of $500 that is the first award 200*a*. In this example, the letters L, C, H, N, U, and A of the player symbol set 38*a* form the complete word including LAUNCH of the second board 34*a*, and thus the player wins the award of $10,000 that is the second award 210*a*.

In this example, the board and player symbol set combination 30*b* includes the first board 32*b* having four words, the second board 34*b* having one word, and player symbol set 38*b* including six letters. In this example, the letters G, C, E, M, D, and A of the player symbol set 38*b* form three completed words including GAME, MADE, and ACE of the first board 32B, and thus the player wins the award of $1,500 that is the first award 200*b*. In this example, the letters G, C, E, M, D, and A of the player symbol set 38*b* do not form the complete word including REACTS of the second board 34*b*, and thus the player does not win the award of $15,000 that is the second award 210*b*.

In this example, the board and player symbol set combination 30*c* includes the first board 32*c* having four words, the second board 34*c* having one word, and player symbol set 38*c* having six letters. In this example, the letters N, A, P, R, K, and E of the player symbol set 38*c* form only one of the completed words including APE of the first board 32C, and thus the player does not win the award of $3,000 that is the first award 200C. In this example, the letters N, A, P, R, K, and E of the player symbol set 38C form the complete word including PRANK of the second board 34C, and thus the player wins the award of $20,000 that is the second award 210C.

In this example, the player awards associated with or won for this lottery ticket total $31,500. As mentioned above, the respective first and second award amounts can vary in accordance with the present disclosure.

It should also be appreciated that for the board and player symbol set combinations, the quantity of the words for each of the first boards 32*a*, 32*b*, and 32*c* can be the same or can vary, the quantity of the words for each of the second boards 34*a*, 34*b*, and 34*c* can be the same or can vary, and the quantity of the letters of the player symbol sets 38*a*, 38*b*, and 38*c* can be the same or can vary.

It should be appreciated that the award paytables can be positioned on the lottery tickets in any suitable manner. It should be appreciated that the award paytable for physical or virtual lottery tickets can be alternatively configured and positioned.

It should be appreciated that in various embodiments, the lottery ticket can include and thus display additional information such as a lottery ticket identification information (not shown) and/or any other relevant lottery ticket related information (not shown). It should also be appreciated that lottery ticket can be manufactured in various known manners or in new manners for producing physical or virtual lottery tickets. It should be appreciated that the shape, size, configuration, and quantity of spaces of the boards can vary in accordance with the present disclosure.

Figure 3:
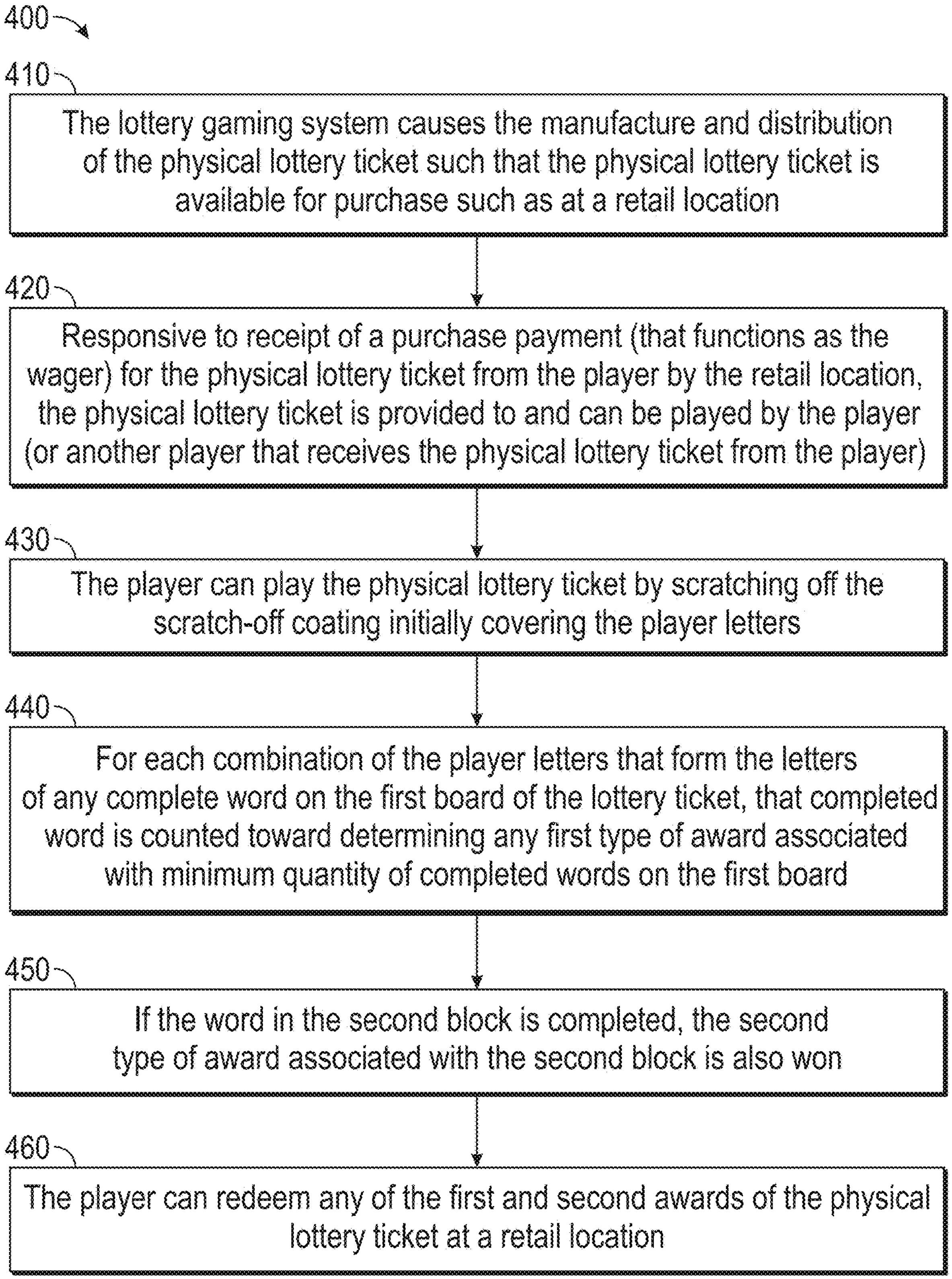
FIG. 3 is a flowchart of an example method of providing the example lottery ticket of FIG. 1 in accordance with one example embodiment of the present disclosure.

FIG. 3 is a flowchart of an example method 400 of providing an example lottery ticket of the present disclosure, where the lottery ticket is a physical lottery ticket. It should be appreciated that this method will vary if the lottery ticket is a virtual lottery ticket.

In the example method illustrated in FIG. 3, the lottery gaming system causes the manufacture and distribution of the physical lottery ticket such that the physical lottery ticket is available for purchase such as at a retail location, as indicated by block 410. The retail location can, for example, be a retail establishment that sells lottery tickets or can be an electronic lottery ticket provider such as a lottery ticket kiosk or otherwise such as explained below.

Responsive to receipt of a purchase payment (that functions as the wager) for the physical lottery ticket from the player by the retail location, the physical lottery ticket is provided to and can be played by the player (or another player that receives the physical lottery ticket from the player), as indicated by block 420.

The player can play the physical lottery ticket by scratching off the scratch-off coating initially covering the player letters, as indicated by block 430. The player can do this in any suitable order for the player letters.

For each first board, for each combination of the player letters that form the letters of any complete word on the first board of the lottery ticket, that completed word is counted toward determining any first type of award associated with the quantity of completed words on the first board, as indicated by block 440. This first type of awards is thus based on the quantity of completed words on each of the respective first boards of the lottery ticket.

For each second board, if the word of the second board is completed, the second type of award associated with the second board is also won, as indicated by block 450. This second type of awards are thus for the completed words on the second boards of the lottery ticket.

In the example method illustrated in FIG. 3, the player can redeem any of the first and second awards for the physical lottery ticket at a retail location (such as the retail establishment or lottery ticket kiosk that sold the player the lottery ticket or another suitable retail location), as indicated by block 460.

Example Lottery Gaming Systems—General

In various embodiments of the present disclosure, the lottery gaming system and method are configured to be provided by a lottery agency (such as a state lottery agency). In various other embodiments of the present disclosure, the lottery gaming system and method are configured to be operated by a third party that runs the lottery for a lottery agency (such as a state lottery agency).

Figure 4:
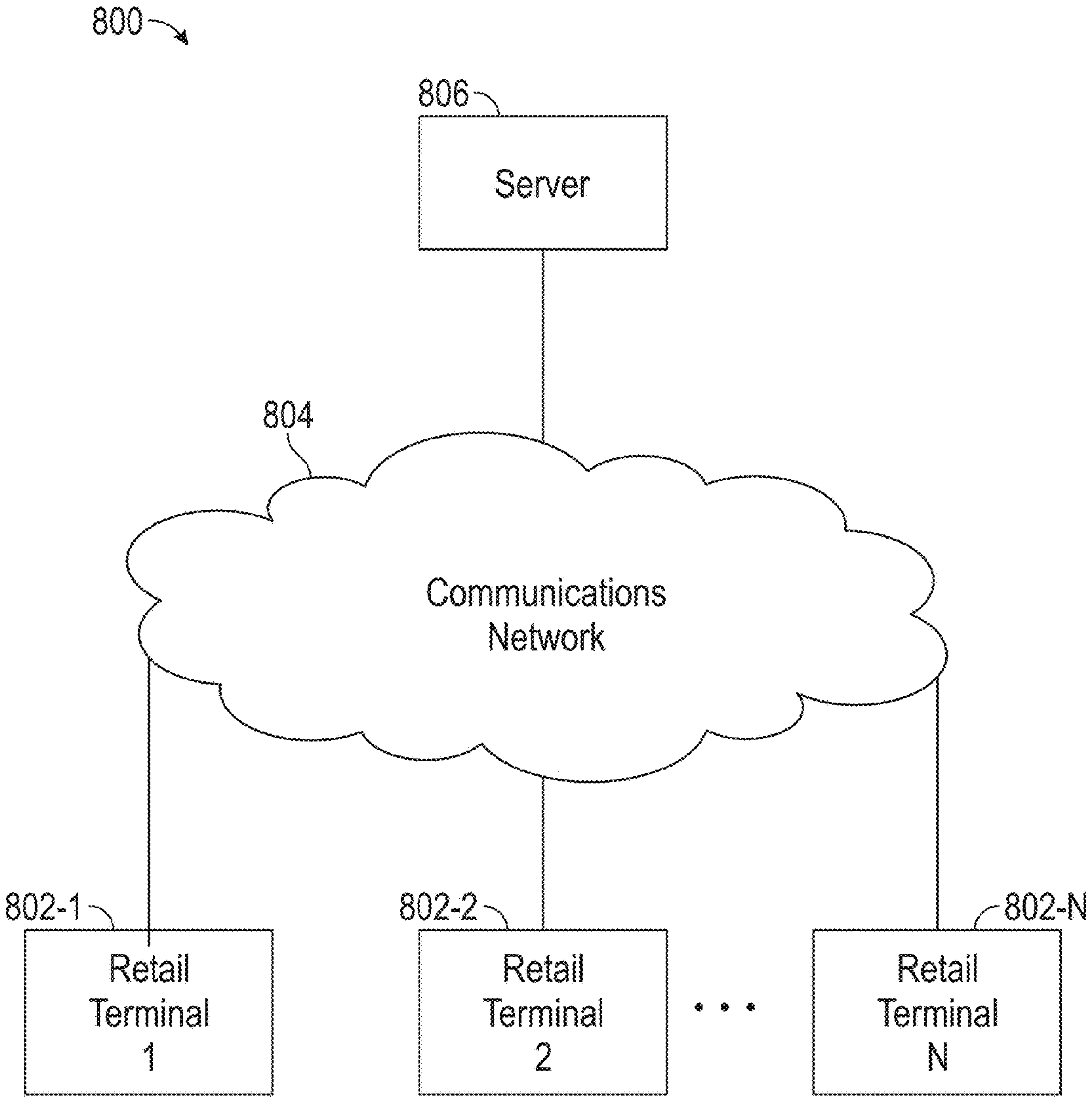
FIG. 4 shows an example lottery gaming system of one example embodiment of the present disclosure.

FIG. 4 illustrates an example networked lottery gaming system 800 for certain types of lottery ticket implementations. This example network lottery gaming system 800 generally includes: (1) a plurality of lottery retailer terminals 802-1 to 802-N; (2) a communications network 804; and (3) one or more lottery servers such as lottery server 806. Generally, the retailer terminals 802-1 to 802-N and the lottery server 806 are configured to perform certain functions described above and further described below.

In various embodiments of the lottery gaming systems and methods of the present disclosure, the player can purchase a respective physical or virtual lottery ticket via a suitable manner such as, but not limited to, one of the following: (1) a dedicated lottery kiosk (e.g., a lottery kiosk) configured to communicate over a data network (such as the Internet) to a lottery server (such as a lottery server 806 described below in connection with FIG. 4); (2) a retailer-operated lottery terminal configured to communicate over a data network (such as the Internet) to a lottery server (such as a lottery server 806 described below in connection with FIG. 4); (3) a personal computer configured to communicate over a data network (such as the Internet) to a lottery server (such as a lottery server 806 described below in connection with FIG. 4); (4) a personal mobile device (such as a cellular telephone, tablet, or PDA) configured to communicate over a data network (such as a wireless or cellular data network) to a lottery server (such as a lottery server 806 described below in connection with FIG. 4); and/or (5) a physical lottery ticket from roll, pack, or book of physical lottery tickets.

In the example embodiment of FIG. 4, each retailer terminal 802 corresponds to (or is associated with) a particular lottery retailer. For example, the first retailer terminal 802-1 of FIG. 4 can be associated with a first lottery retailer, such as a convenience store, and the second retailer terminal 802-2 of FIG. 4 can be associated with a second lottery retailer, such as a supermarket. It should be understood that any suitable quantity of lottery retailer terminals can be employed in the lottery gaming system 800, along with any suitable quantity of corresponding lottery servers 806.

In various example embodiments, the lottery retailer terminal 802 includes one or more processor(s). Generally, the processor is operative to perform or process instructions, and in particular, to operate in accordance with the various methods described herein. For example, the processor of the lottery retailer terminal 802 can be operable to enable the lottery retailer terminal 802 to transmit data to (and receive data from) the lottery server 806. More specifically, for physical lottery tickets, the processor can enable the transmission of data representing: (a) a physical lottery ticket pack (including a plurality of lottery tickets) for validation of the physical lottery tickets in that lottery ticket pack; and/or (b) each physical lottery ticket upon a player redeeming that physical lottery ticket at such lottery retailer. For virtual lottery tickets, the processor can enable the transmission of data representing: (a) each virtual lottery ticket for the sale of that virtual lottery ticket; and/or (b) each virtual lottery ticket upon a player redeeming that virtual lottery ticket at such lottery retailer.

In various example embodiments, the lottery retailer terminal 802 includes one or more input device(s). The input devices of the lottery retailer terminal 802 can include components such as an optical scanner and/or a barcode scanner, for reading and/or for deriving information associated with a lottery ticket. For example, a lottery ticket can include registration marks, authenticity data, various codes, micro-printed indicia, one or more sense marks, and/or other lottery indicia that must be read. Examples of additional input devices include, but are not limited to, a keypad, a mouse, an image capturing device (e.g., an optical character recognition (OCR) device), a biometric reader, a portable storage device (e.g., a memory stick), and the like.

In various example embodiments, the input device(s) of one or more of the lottery retailer terminals 802 can include a clock. The clock can be employed to detect, derive and/or append time and/or date information for use by the lottery server 806 to: (i) create a data record corresponding to lottery tickets purchased or redeemed at the lottery retailer terminal 802, (ii) to determine redemption time, round and/or date information associated with lottery tickets, and/or (iii) determine whether a lottery player has redeemed their lottery ticket in a manner that qualifies the player to receive a particular redemption or settlement amount.

In various example embodiments, one or more of the lottery retailer terminals 802 includes one or more output device(s). Such output device(s) can include such components as a display for outputting information to a lottery player or to a terminal operator (e.g., win/loss information and/or payout amounts), one or more benefit output devices (e.g., a cash drawer, a currency dispenser), a printer for producing a physical record (e.g., paper slip, receipt, ticket, voucher, coupon, etc.) that defines a lottery ticket, audio/video output device(s), and the like.

In various example embodiments, one or more of the lottery retailer terminals 802 also includes one or more communications port(s), such as a serial port, a modem, or the like. Generally, the communications port of the lottery retailer terminal 802 can be operable to facilitate two-way data communications between (i) the lottery retailer terminal 802, and (ii) the lottery server 806. In accordance with some embodiments, the communications port of the lottery retailer terminal 802 can operate to facilitate the transmission of information between the lottery retailer terminal and a player device such as a personal digital assistant (PDA), cell phone and/or a dedicated (e.g., a proprietary) device.

In various example embodiments, one or more of the lottery retailer terminals 802 includes a data storage device such as a hard disk, optical or magnetic media, random access memory (RAM) and/or read-only memory (ROM), or the like memory device. Generally, the data storage device of the lottery retailer terminal 802 stores a software program, the software program enabling a processor of the retailer terminal 802 to perform various functions including some or all of the various steps described herein. For example, in accordance with certain embodiments, the lottery retailer terminal 802 can be configured to perform some or all of the functions of the lottery server 806 (and vice versa) such that the lottery server 806 and the lottery retailer terminal 802 can be considered as the same "device."

In various example embodiments, a lottery ticket sales device can be utilized in place of a lottery retailer terminal 802. Such a lottery ticket sales device can be implemented as a lottery server, a controller, a dedicated hardware circuit, an appropriately programmed general-purpose computer, or any other equivalent electronic, mechanical, or electro-mechanical device. Thus, in various embodiments, a lottery ticket sales device can include, for example, but is not limited to: (1) a video lottery terminal that can include a touch sensitive screen for use by a player; (2) a personal computer (e.g., which communicates with a remote lottery server); or (3) a personal mobile device such as a mobile telephone, a tablet, or a personal digital assistant. The lottery ticket sales device can include any or all of the devices of the aforementioned systems.

In this example embodiment, the lottery server 806 operates to: (1) receive and/or store data associated with one or more lottery tickets including such data as: (a) ticket identifier(s), and (b) ticket indicia; (2) determine at least a first redemption amount associated with a lottery ticket; (3) receive a redemption request associated with the lottery ticket; (4) determine a time of play associated with the redemption request; and (5) transmit an indication of the appropriate redemption amount to a lottery retailer terminal (e.g., for output or display to a lottery player and/or lottery terminal operator).

In various example embodiments, the lottery server 806 includes one or more processor(s). Such a processor functions to process instructions, and in particular, to operate in accordance with various methods described herein. For example, the processor can operate to enable the lottery server 806 to transmit data to (and receive data from) the lottery retailer terminal 802. More specifically, the processor of the lottery server 806 can enable the transmission of data representing a lottery ticket, as well as information defining one or more payout(s) associated with that lottery ticket to or by a specific one of the lottery retailer terminals 802 shown in the lottery network 800 of FIG. 4. Thus, the lottery server 806 can be implemented as a system controller, a dedicated hardware circuit, an appropriately and particularly programmed general-purpose computer, or any other equivalent electronic, mechanical, or electro-mechanical device capable of providing for one or more of the embodiments described herein.

In various example embodiments, the lottery server 806 includes one or more input device(s). Examples of such input devices include a keypad, a mouse, a touchscreen, a random number generator, a microphone, and other digital or analog input devices.

In various example embodiments, the lottery server 806 also includes one or more output device(s). Example of output device(s) of the lottery server 806 include a monitor or other display for outputting information to an operator of the lottery server 806 (e.g., for displaying information such as statistical or sales data, win and loss information and/or payout amounts), a printer for producing a physical record (e.g., a report) of such data, and the like. In addition, the lottery server 806 can include one or more communications ports, such as a serial port, modem, or the like, operable to facilitate two-way data communications between (i) the lottery server 806 and (ii) one or more lottery retailer terminals 802.

In various example embodiments, the lottery server 806 includes a data storage device (e.g., a hard disk or hard drive, a media-based (removable) memory, or the like). In certain embodiments, the data storage device of the lottery server 806 stores at least one software program, which includes a program to enable the processor of the lottery server 806 to perform some or all of the various steps and functions of at least one implementation of the methods described in detail herein. In addition, the data storage device of the lottery server 806 can operate to store one or more databases including a lottery ticket database and a lottery ticket redemption status database.

In various example embodiments, the lottery server 806 includes a lottery ticket server device that is located at a lottery ticket printing facility, and can also function to manage the ticket printing process. The lottery server 806 can also function to develop a lottery game matrix (e.g., determining base payouts, win frequencies, and the like) and to match static lottery content with secure paytable (or payout distribution) data. In certain embodiments, a lottery ticket printer device for use in such lottery gaming systems can utilize the game matrix information from the lottery server and can apply it to the secure paytable data.

In certain example embodiments, a retailer terminal (such as the first retailer terminal 802-1) of FIG. 4 is configured to perform some or all of the functions of the lottery server 806. Thus, in certain example embodiments, the lottery server 806 and the retailer terminal (such as the first retailer terminal 802-1) (or another given retailer terminal and server pairing) can be considered as the same "device."

Generally, the communications network 804 of FIG. 4 includes one or more local and/or wide-area network(s) proprietary and/or public network(s) (e.g., the Internet) for facilitating two-way data communications between the retailer terminals 802 and the lottery server 806. The lottery server 806 can communicate with lottery retailer terminals 802 directly or indirectly, via a wired or wireless medium, such as via the Internet, via a local area network (LAN), via a wide area network (WAN), via an Ethernet, via a Token Ring, via a telephone line, via a cable line, via a radio channel, via an optical communications line, via a satellite communications link, or via any other appropriate communications system or combinations thereof. Any number and type of devices can be in communication with the lottery server 806, and communication between the lottery retailer terminals 802 and the lottery server 806 can be direct or indirect. A variety of communications protocols can be part of any such communications system, including, but not limited to: Ethernet (or IEEE 802.3), SAP, ATP, Bluetooth™, and TCP/IP.

It should be understood that devices in communication with each other need not be continually transmitting to each other. On the contrary, such devices need only transmit to each other as necessary, and can actually refrain from exchanging data most of the time. For example, a device in communication with another device via the Internet may not transmit data to the other device for days or weeks at a time. In some embodiments, a server may not be necessary and/or preferred. For example, in one or more embodiments, methods described herein can be practiced on a stand-alone gaming device and/or a gaming device in communication only with one or more other gaming devices. In such an embodiment, any functions described as performed by the computer can instead be performed by one or more gaming devices.

As used herein, a lottery retailer can include a merchant who sells lottery tickets at a particular location, authenticates winning lottery tickets, redeems authenticated winning lottery tickets, and/or provides awards to players for winning lottery tickets. Examples of various lottery retailers include, but are not limited to, convenience stores, gas stations, supermarkets, and gaming establishments.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket comprising:
- a base;
- a first board, a second board, and a first player symbol set on the base, wherein the first board is different than the second board, wherein the first board comprises a plurality of symbol sets, wherein the second board comprises one symbol set, and wherein the first player symbol set is for both of the first and second boards;
- a third board, a fourth board, and a second player symbol set on the base, wherein the third board is different than the fourth board, wherein the third board comprises a plurality of symbol sets, wherein the fourth board comprises one symbol set, and wherein the second player symbol set is for both of the third and fourth boards;
- a removable covering on the base and covering the first and second player symbol sets; and
- a paytable on the base, the paytable indicating first and second awards respectively associated with the first and second boards, and the paytable indicating third and fourth awards respectively associated with the third and fourth boards.

2. The lottery ticket of claim 1, wherein a symbol of the first player symbol set is employed for one of the third board and the fourth board.

3. The lottery ticket of claim 2, wherein a symbol of the second player symbol set is employed for one of the first board and the second board.

4. The lottery ticket of claim 1, wherein the paytable indicates an additional award based on a completion of one of the first and second boards and one of the third and fourth boards.

5. The lottery ticket of claim 1, wherein the first and second boards and the first player symbol set are completely separate and independent from the third and fourth boards and the second player symbol set.

6. The lottery ticket of claim 1, which comprises a fifth board, a sixth board, and a third player symbol set on the base, wherein the fifth board is different than the sixth board, wherein the fifth board comprises a plurality of symbol sets, wherein the sixth board comprises one symbol set, wherein the third player symbol set is for both of the fifth and sixth boards, wherein the paytable indicates fifth and sixth awards respectively associated with the fifth and sixth boards.

7. The lottery ticket of claim 1, which is a physical lottery ticket, wherein the base comprises a substrate, the symbol sets are printed on the substrate, the player symbol sets are printed on the substrate, the removable covering comprises a scratch-off coating covering the player symbol sets, and the paytable is printed on the base.

8. The lottery ticket of claim 1, which is a virtual lottery ticket.

9. A lottery ticket comprising:
- a base;
- a first board, a second board, and a first player symbol set on the base, wherein the first board is different than the second board, wherein the first board comprises a plurality of symbol sets, wherein the second board comprises only one symbol set, and wherein the first player symbol set is for both of the first and second boards;
- a third board, a fourth board, and a second player symbol set on the base, wherein the third board is different than the fourth board, wherein the third board comprises a plurality of symbol sets, wherein the fourth board comprises only one symbol set, and wherein the second player symbol set is for both of the third and fourth boards;
- a fifth board, a sixth board, and a third player symbol set on the base, wherein the fifth board is different than the sixth board, wherein the fifth board comprises a plurality of symbol sets, wherein the sixth board comprises one symbol set, wherein the third player symbol set is for both of the fifth and sixth boards;
- a removable covering on the base and covering the first and second player symbol sets; and
- a paytable on the base, the paytable indicating first and second awards respectively associated with the first and second boards, the paytable indicating third and fourth awards respectively associated with the third and fourth boards, and the paytable indicating fifth and sixth awards respectively associated with the fifth and sixth boards, wherein the first, second, third, fourth, fifth, and sixth awards are different.

10. The lottery ticket of claim 9, wherein the symbol sets are words comprising letters and the player symbol sets comprise letters.

11. The lottery ticket of claim 10, wherein the first, second, and third player symbol sets each comprise a same quantity of letters.

12. The lottery ticket of claim 9, which is a physical lottery ticket, wherein the base comprises a substrate, the symbol sets of the first, second, third, fourth, fifth, and sixth boards are printed on the substrate, the first, second, and third player symbol sets are printed on the substrate, the removable covering is a scratch-off coating covering the first, second, and third player symbol sets, and the paytable is printed on the base.

13. The lottery ticket of claim 9, which is a virtual lottery ticket.

* * * * *